(12) United States Patent
Tillery et al.

(10) Patent No.: US 9,777,637 B2
(45) Date of Patent: Oct. 3, 2017

(54) GAS TURBINE FUEL FLOW MEASUREMENT USING INERT GAS

(71) Applicant: General Electric Company, Schenectady, NY (US)

(72) Inventors: Steven William Tillery, Simpsonville, SC (US); Jason Nathaniel Cook, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1017 days.

(21) Appl. No.: 13/719,714

(22) Filed: Dec. 19, 2012

(65) Prior Publication Data

US 2013/0232976 A1 Sep. 12, 2013

Related U.S. Application Data

(63) Continuation-in-part of application No. 13/415,382, filed on Mar. 8, 2012.

(51) Int. Cl.
| | |
|---|---|
| *G06F 19/00* | (2011.01) |
| *F02C 7/22* | (2006.01) |
| *F17D 3/00* | (2006.01) |
| *G01F 1/704* | (2006.01) |

(52) U.S. Cl.
CPC .............. *F02C 7/22* (2013.01); *F17D 3/00* (2013.01); *G01F 1/704* (2013.01); *F05D 2270/306* (2013.01); *Y10T 137/8376* (2015.04)

(58) Field of Classification Search
USPC ....... 700/34, 43, 270, 287; 60/734; 137/560; 73/861.07
See application file for complete search history.

(56) References Cited

U.S. PATENT DOCUMENTS

| | | | |
|---|---|---|---|
| 3,596,467 A | 8/1971 | Avery | |
| 3,604,405 A | 9/1971 | Maher | |
| 3,665,959 A | 5/1972 | Castillon | |
| 3,738,104 A | 6/1973 | Rosa | |
| 3,771,507 A | 11/1973 | Silvester | |
| 3,814,559 A | 6/1974 | Akers, II et al. | |
| 3,831,439 A | 8/1974 | Konomi | |
| 3,834,160 A | 9/1974 | Moehring et al. | |
| 3,842,809 A | 10/1974 | King | |
| 3,909,159 A | 9/1975 | Jansen et al. | |
| 3,916,854 A | 11/1975 | Barton et al. | |

(Continued)

FOREIGN PATENT DOCUMENTS

| | | |
|---|---|---|
| CN | 201177634 Y | 1/2009 |
| JP | 2004361088 A | 12/2004 |

(Continued)

OTHER PUBLICATIONS

US 6,858,131, 02/2005, Okada et al. (withdrawn)

(Continued)

*Primary Examiner* — Kidest Bahta
(74) *Attorney, Agent, or Firm* — Nixon & Vanderhye P.C.

(57) ABSTRACT

The fuel flow rate to a gas turbine is measured using an inert gas. The inert gas is injected into the fuel flow and the concentration of the inert gas in the fuel/inert gas mixture is later measured. The concentration of the inert gas in the fuel/inert gas mixture is then used to calculate the mass flow rate of the fuel.

19 Claims, 3 Drawing Sheets

(56) References Cited

U.S. PATENT DOCUMENTS

| | | | |
|---|---|---|---|
| 3,931,368 A | 1/1976 | Barker et al. | |
| 3,937,195 A | 2/1976 | Woods | |
| 3,985,029 A | 10/1976 | Green | |
| 4,005,689 A * | 2/1977 | Barnard | F02D 41/144 123/478 |
| 4,071,898 A | 1/1978 | Schorsch et al. | |
| 4,121,455 A * | 10/1978 | Haslett et al. | 73/861.04 |
| 4,167,169 A | 9/1979 | White | |
| 4,253,440 A | 3/1981 | Sumiyoshi et al. | |
| 4,282,710 A | 8/1981 | Avant | |
| 4,428,193 A * | 1/1984 | Papp | B01F 3/02 123/1 A |
| 4,441,371 A | 4/1984 | Cockshott et al. | |
| 4,446,727 A | 5/1984 | Kurihara et al. | |
| 4,462,346 A | 7/1984 | Haman et al. | |
| 4,484,479 A | 11/1984 | Eckhardt | |
| 4,493,635 A | 1/1985 | Ito et al. | |
| 4,519,958 A | 5/1985 | Kendig | |
| 4,528,100 A | 7/1985 | Zarchy | |
| 4,572,667 A | 2/1986 | Rogers | |
| 4,574,619 A * | 3/1986 | Castellant | G01F 1/704 73/40.7 |
| 4,715,213 A * | 12/1987 | McGreehan | F16J 15/4472 277/320 |
| 4,821,557 A | 4/1989 | Beeson, III | |
| 4,835,654 A | 5/1989 | Riley | |
| RE32,938 E | 6/1989 | Haman et al. | |
| 4,843,405 A * | 6/1989 | Morikawa et al. | 347/224 |
| 4,928,524 A | 5/1990 | Sugi et al. | |
| 5,024,055 A | 6/1991 | Sato et al. | |
| 5,033,312 A | 7/1991 | Stupecky | |
| 5,205,161 A | 4/1993 | Erwin | |
| 5,231,871 A | 8/1993 | Arai et al. | |
| 5,236,634 A | 8/1993 | Hammett et al. | |
| 5,247,790 A | 9/1993 | Donlan et al. | |
| 5,305,714 A | 4/1994 | Sekiguchi et al. | |
| 5,322,645 A | 6/1994 | Hammett et al. | |
| 5,337,617 A | 8/1994 | Dimeff | |
| 5,360,139 A | 11/1994 | Goode | |
| 5,386,721 A | 2/1995 | Alvizar | |
| 5,431,733 A | 7/1995 | Shibuya et al. | |
| 5,448,919 A | 9/1995 | Fawcett, Jr. et al. | |
| 5,465,583 A | 11/1995 | Goode | |
| 5,515,680 A * | 5/1996 | Fujimura | B01F 5/0405 239/434 |
| 5,602,745 A | 2/1997 | Atchley et al. | |
| 5,703,777 A | 12/1997 | Buchhop et al. | |
| 5,794,549 A | 8/1998 | Carter | |
| 5,805,973 A | 9/1998 | Coffinberry et al. | |
| 5,868,175 A | 2/1999 | Duff et al. | |
| 5,877,430 A | 3/1999 | Peace et al. | |
| 5,891,584 A | 4/1999 | Coffinberry | |
| 5,992,439 A | 11/1999 | McGill | |
| 6,065,280 A | 5/2000 | Ranasinghe et al. | |
| 6,189,312 B1 | 2/2001 | Smith | |
| 6,230,103 B1 | 5/2001 | DeCorso et al. | |
| 6,435,204 B2 | 8/2002 | White et al. | |
| 6,453,757 B1 | 9/2002 | Montag et al. | |
| 6,460,400 B1 | 10/2002 | Ichikawa | |
| 6,530,207 B2 | 3/2003 | Tobo et al. | |
| 6,538,818 B2 | 3/2003 | Holmes | |
| 6,615,534 B1 * | 9/2003 | Smithyman et al. | 43/125 |
| 6,778,937 B2 | 8/2004 | Cleary | |
| 6,810,345 B2 | 10/2004 | Matsumura et al. | |
| 6,823,677 B2 | 11/2004 | Prociw et al. | |
| 6,880,324 B2 | 4/2005 | Tanaka | |
| 6,904,815 B2 | 6/2005 | Widmer et al. | |
| 6,923,054 B2 | 8/2005 | Liu et al. | |
| 6,935,191 B2 | 8/2005 | Olivier et al. | |
| 6,962,043 B2 | 11/2005 | Venkateswaran et al. | |
| 6,968,283 B2 | 11/2005 | Matsumura et al. | |
| 6,994,309 B2 | 2/2006 | Fernandez-Sein | |
| 7,028,561 B2 | 4/2006 | Robertson et al. | |
| 7,082,826 B2 | 8/2006 | Robertson | |
| 7,155,956 B2 | 1/2007 | Tang | |
| 7,168,690 B2 | 1/2007 | Grant | |
| 7,188,465 B2 | 3/2007 | Kothnur et al. | |
| 7,204,158 B2 | 4/2007 | Morgan et al. | |
| 7,225,085 B2 | 5/2007 | Zhang et al. | |
| 7,228,614 B2 | 6/2007 | Yamada et al. | |
| 7,248,755 B2 | 7/2007 | Sappey et al. | |
| 7,276,151 B1 | 10/2007 | Okada et al. | |
| 7,303,046 B2 | 12/2007 | Gallagher et al. | |
| 7,303,047 B2 | 12/2007 | Gallagher et al. | |
| 7,303,048 B2 | 12/2007 | Gallagher et al. | |
| 7,369,723 B1 | 5/2008 | Mescher | |
| 7,437,927 B2 | 10/2008 | Yamada et al. | |
| 7,451,537 B2 | 11/2008 | Liu et al. | |
| 7,454,656 B2 | 11/2008 | Okada et al. | |
| 7,454,956 B1 | 11/2008 | Lopresti | |
| 7,461,509 B2 | 12/2008 | Mick et al. | |
| 7,497,012 B2 | 3/2009 | Prociw et al. | |
| 7,503,172 B2 * | 3/2009 | Sakakura | B60K 17/10 180/242 |
| 7,506,496 B2 * | 3/2009 | Mantchenkov et al. | 60/39.461 |
| 7,526,955 B2 | 5/2009 | Miyata et al. | |
| 7,611,676 B2 | 11/2009 | Inage et al. | |
| 7,625,532 B2 | 12/2009 | Bridgwater et al. | |
| 7,644,574 B2 | 1/2010 | Feiz | |
| 7,685,802 B2 | 3/2010 | Feiz | |
| 7,717,294 B2 | 5/2010 | Bodemann | |
| 7,739,004 B2 | 6/2010 | Johnson | |
| 7,752,833 B2 | 7/2010 | Feiz | |
| 7,826,144 B2 | 11/2010 | Mescher | |
| 7,845,688 B2 | 12/2010 | Gallagher et al. | |
| 7,846,405 B2 | 12/2010 | Lanier et al. | |
| 7,886,702 B2 | 2/2011 | Jerrell et al. | |
| 7,900,522 B2 | 3/2011 | Reeve | |
| 7,913,690 B2 | 3/2011 | Fisher et al. | |
| 7,921,651 B2 | 4/2011 | Alexander et al. | |
| 8,015,816 B2 | 9/2011 | Hall | |
| 8,018,590 B2 | 9/2011 | Davis, Jr. et al. | |
| 8,021,446 B2 | 9/2011 | Adams et al. | |
| 8,056,317 B2 | 11/2011 | Feiz | |
| 8,099,940 B2 | 1/2012 | Twardochleb et al. | |
| 8,126,631 B2 | 2/2012 | Scalia, Jr. | |
| 8,151,571 B2 | 4/2012 | Maly et al. | |
| 9,429,079 B2 * | 8/2016 | Guethe | F02C 9/263 |
| 2002/0158202 A1 | 10/2002 | Webber et al. | |
| 2002/0187449 A1 | 12/2002 | Doebbeling et al. | |
| 2006/0107666 A1 | 5/2006 | Kothnur et al. | |
| 2008/0257012 A1 * | 10/2008 | Foulart | F02B 77/086 73/23.31 |
| 2010/0163119 A1 * | 7/2010 | Isobe et al. | 137/486 |
| 2010/0171956 A1 | 7/2010 | Sappey et al. | |
| 2010/0175674 A1 | 7/2010 | Vennettilli et al. | |
| 2010/0251699 A1 | 10/2010 | Mehendale et al. | |

FOREIGN PATENT DOCUMENTS

| | | |
|---|---|---|
| RU | 2495268 C2 | 10/2013 |
| WO | 2007129993 A1 | 11/2007 |

OTHER PUBLICATIONS

Non-Final Office Action issued in connection with Related U.S. Appl. No. 13/617,192 on May 5, 2015.

Non-Final Office Action issued in connection with Related U.S. Appl. No. 13/617,192 on Dec. 31, 2015.

Russian Office Action issued in connection with related RU Application No. 2013110026/28 (014835) on Jun. 16, 2016.

Unofficial English Translation of Chinese Office Action issued in connection with corresponding CN Application No. 201310075077.0 on Jun. 20, 2016.

Final Office Action issued in connection with Related U.S. Appl. No. 13/617,192 on Jun. 24, 2016.

* cited by examiner

GAS TURBINE FUEL FLOW MEASUREMENT USING INERT GAS

CROSS-REFERENCE TO APPLICATION

The application is a continuation-in-part of U.S. patent application Ser. No. 13/415,382, filed Mar. 8, 2012, pending, which is incorporated herein by reference in its entirety.

FIELD OF THE INVENTION

The present technology relates generally to gas turbines and more particularly to systems and methods for optimizing gas turbines by, for example, accurately measuring fuel mass flow rate.

BACKGROUND OF THE INVENTION

Gas turbine engines typically include a compressor for compressing incoming air, a combustor for mixing fuel with the compressed air and igniting the fuel/air mixture to produce a high temperature gas stream, and a turbine section that is driven by the high temperature gas stream. The amount of fuel required to generate an observed power level defines the efficiency of the system. However, in many known gas turbine systems, the accuracy of the fuel flow measurement is not adequate for detailed performance assessments.

BRIEF SUMMARY OF THE INVENTION

One exemplary but nonlimiting aspect of the disclosed technology relates to a system. The system comprises a transport medium to convey a gas flow, an injection device to inject an inert gas into the gas flow to form a gas mixture, and a concentration measuring device downstream of the injection device to measure a concentration of the inert gas in the gas mixture, wherein a flow rate of the gas flow is calculated based on the measured concentration of the inert gas in the gas mixture.

In another exemplary but nonlimiting embodiment, there is provided a method of measuring the flow rate of a gas. The method comprises injecting an inert gas into a gas flow at an injection location, mixing the inert gas with the gas flow to form a gas mixture, measuring a concentration of the inert gas in the gas mixture downstream of the injection location, and calculating a flow rate of the gas flow based on the measured concentration of the inert gas in the gas mixture.

In another exemplary but nonlimiting embodiment, there is provided a gas turbine. The gas turbine comprises a fuel line to convey a flow of fuel to a combustor section of the gas turbine, an injection device to inject an inert gas into the fuel flow to form a gas mixture, and a concentration measuring device downstream of the injection device to measure a concentration of the inert gas in the gas mixture, wherein a flow rate of the fuel flow is calculated based on the measured concentration of the inert gas in the gas mixture.

BRIEF DESCRIPTION OF THE DRAWINGS

The accompanying drawings facilitate an understanding of the various examples of this technology. In such drawings.

DETAILED DESCRIPTION OF THE ILLUSTRATED EMBODIMENTS

Figure 1:
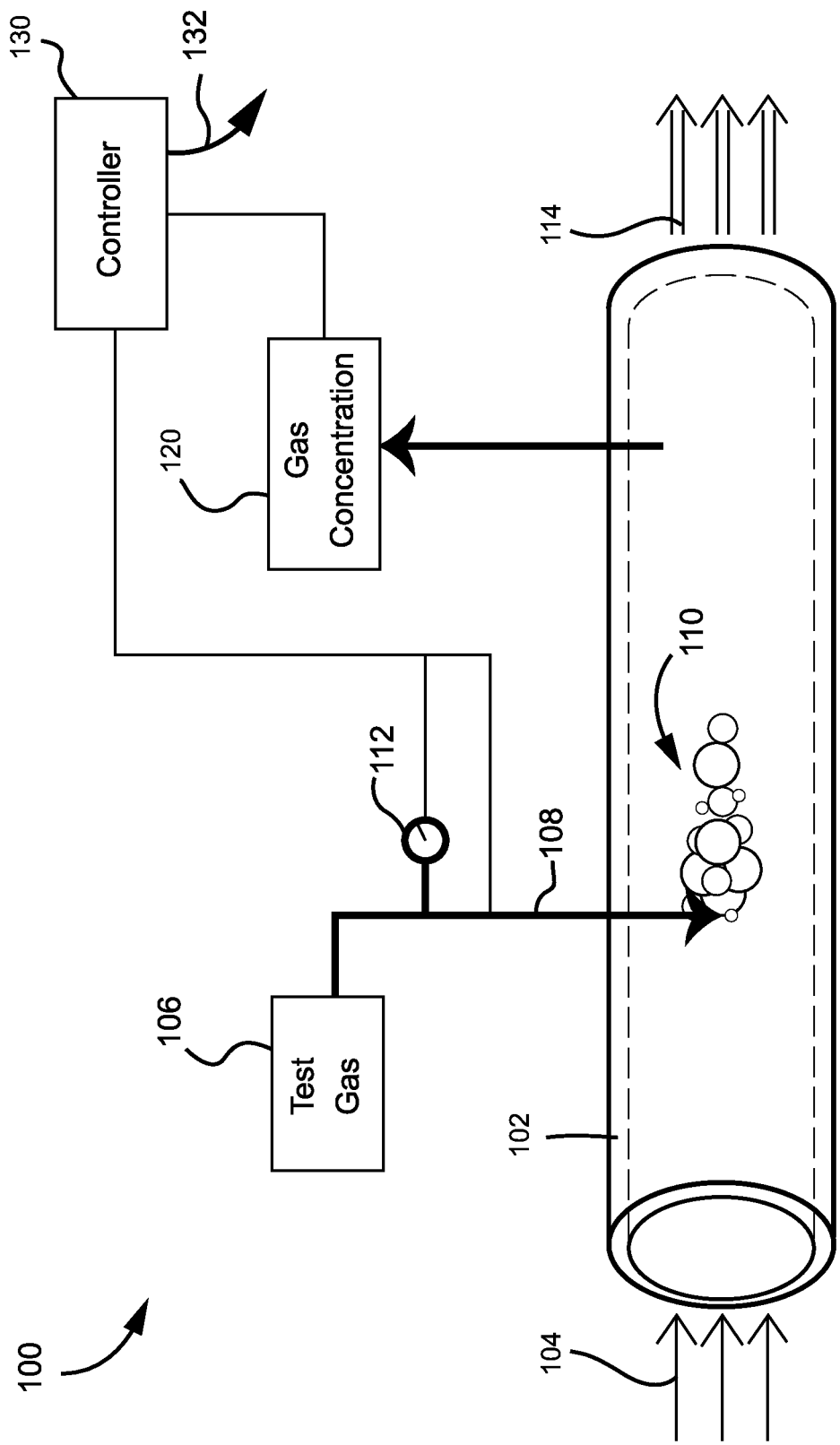
FIG. 1 is a schematic representation of an example gas flow rate measuring system.

Referring to FIG. 1, an example gas flow rate measuring system is shown. Particularly, a fuel flow rate measuring system 100 for use with a gas turbine is shown in the illustrated example of FIG. 1. The mass flow rate of the fuel is calculated based on the measured concentration of a test gas injected into the fuel flow.

Accurately understanding the amount of fuel being burned by a gas turbine is critical when assessing the performance of the gas turbine system. The amount of fuel required to generate an observed power level defines the efficiency of the system. Thus, accurately measuring the fuel flow rate is essential for detailed performance assessments. For instance, an accurate fuel flow measurement enables accurate assessments of gas turbine efficiency. The disclosed technique improves on the accuracy of current systems for measuring mass flow rate. An improved heat balance resulting from a more accurate representation of the fuel flow allows for more accurate assignment of component performance during testing. Further, when the fuel flow rate is accurately represented, sophisticated control algorithms may be developed that use the measured fuel flow as an input. Real-time plant optimization related to system efficiency may also be implemented.

As shown in FIG. 1, the fuel flow rate measuring system 100 includes a transport medium (e.g., fuel line 102) for transporting a fuel flow 104 to a gas turbine (not shown). The fuel flow 104 may be methane gas or any other suitable gas fuel. A test gas 110 is injected into the fuel flow 104 with an injection device 108 (e.g., a nozzle). The injection device 108 may be configured to dispense a desired known quantity of the test gas into the fuel flow 104 thereby forming a fuel/test gas mixture 114. The injection device 108 is in fluid communication with a supply 106 of the test gas 110. A flow meter 112 may measure the amount of the test 110 gas injected into the fuel flow 104.

The amount of test gas 110 injected into the fuel flow 104 may be communicated to a controller 130. The controller 130 may include at least one programmable processor. Further, the controller 130 may control the injection device 108 (e.g., by a valve) so as to control the amount of test gas 110 injected into the fuel flow 104.

The composition of the fuel/test gas mixture 114 is measured at a location downstream of the injection device. The gas composition may be measured by a gas analyzer 120 or any other suitable device as those skilled in the art will recognize. The test gas 110 is adequately mixed into the fuel flow before the composition measurement is taken. The concentration of the test gas 110 in the fuel/test gas mixture 114 is identified and recorded. The composition data may be communicated to the controller 130.

The mass flow rate of the fuel flow 104 may be calculated based on the measured concentration of the test gas 110 in the fuel/test gas mixture 114. Since the composition and amount of the test gas 110 are known, the measured concentration of the test gas in the fuel/test gas mixture 114 can be used to calculate the volume of fuel passing through a given point in the fuel line 102 (i.e., mass flow rate) as one skilled in the art will understand.

Control of a device (e.g., a gas turbine system or component thereof) may be based on the fuel flow rate measurement. In an example, the controller 130 may control such a device through communication line 132.

The test gas 110 is preferably a gas that is not already present in the fuel flow 104 so that an accurate concentration of the injected test gas can be measured. Additionally, the test gas 110 may be a gas that does not impede the combustion process such as an inert gas (e.g., neon). In an example, the gas may be a gas mixture (e.g., comprised of multiple gases) of known constituents.

Figure 2:
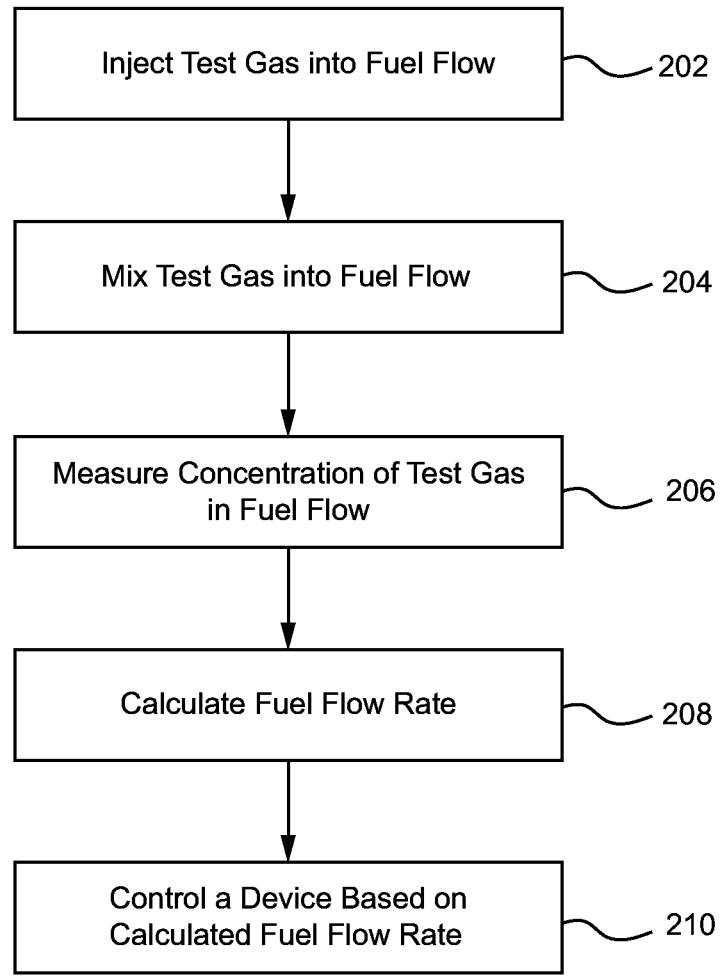
FIG. 2 is a flow chart diagram of computer program code structure for an example gas flow rate measuring method.

Referring to FIG. 2, an example method may be performed with assistance of the controller 130. The method may include injecting a known quantity of the test gas (the composition of which is also known) into the fuel flow, as indicated in step 202. In step 204, the test gas is mixed into the fuel flow. Next, in step 206, the concentration of the test gas in the fuel flow is measured. In step 208, the fuel flow rate is calculated. Then, the controller 130 may control a device (e.g., a gas turbine or component thereof) based on the calculated fuel flow rate.

Figure 3:
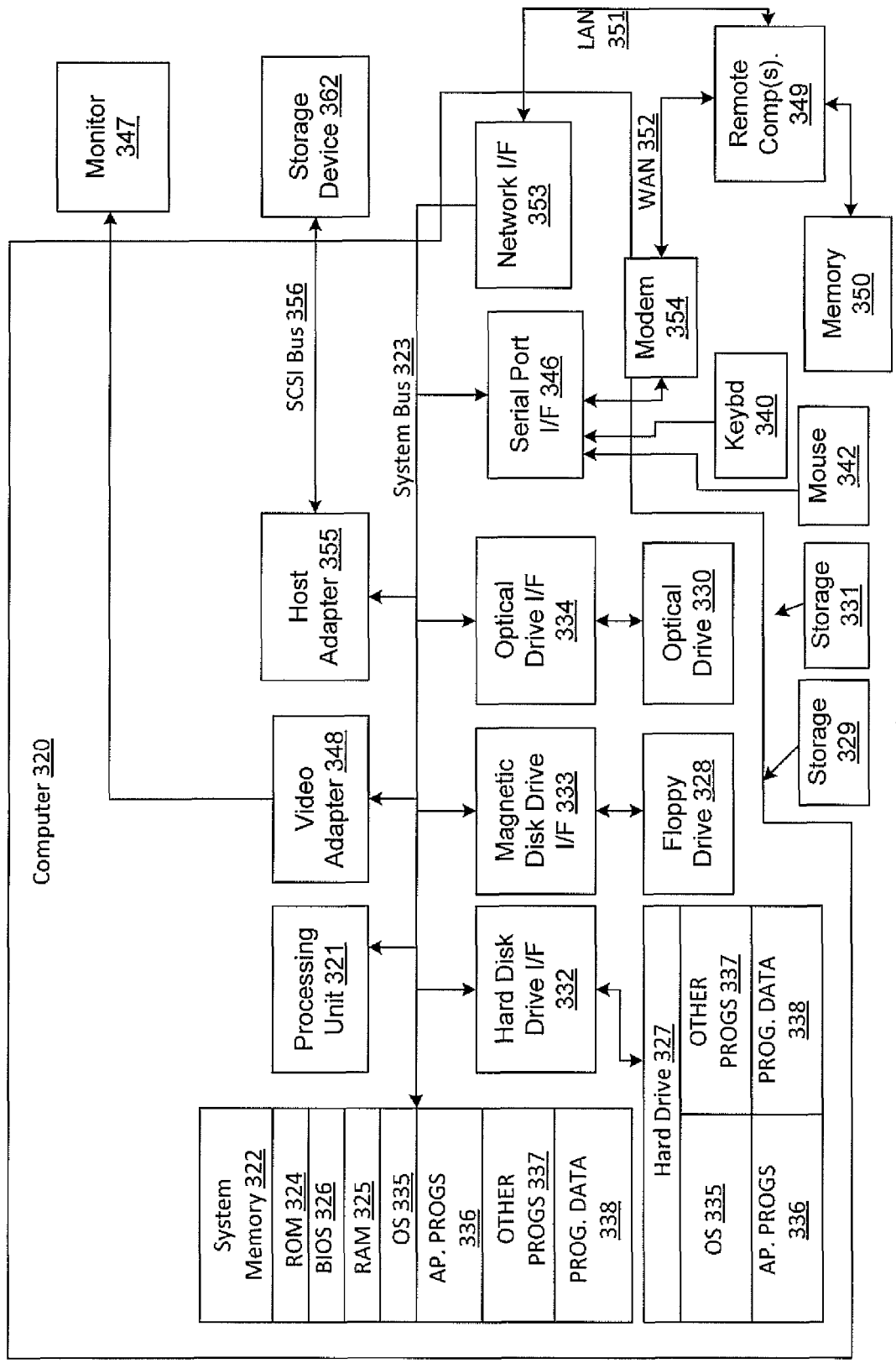
FIG. 3 is an example block diagram representing a general purpose computer system in which aspects of the example gas flow rate measuring system and gas flow rate measuring method may be incorporated.

FIG. 3 and the following discussion are intended to provide a brief general description of a suitable computing environment in which the disclosed technology and/or portions thereof may be implemented. The gas concentration and subsequent gas turbine control may both be handled through a gas turbine control system. It is possible that a separate computing system may be used in parallel or series with the gas turbine controller to handle the test gas concentration calculation and information distribution.

The disclosed technology may be described in the general context of computer-executable instructions, such as computer program code structures or program modules, being executed by a computer, such as a client workstation, server, or personal computer. Generally, program modules include routines, programs, objects, components, data structures and the like that perform particular tasks or implement particular abstract data types. Moreover, it should be appreciated that the disclosed technology and/or portions thereof may be practiced with other computer system configurations, including hand-held devices, multi-processor systems, microprocessor-based or programmable consumer electronics, network PCs, minicomputers, mainframe computers and the like. The disclosed technology may also be practiced in distributed computing environments where tasks are performed by remote processing devices that are linked through a communications network. In a distributed computing environment, program modules may be located in both local and remote memory storage devices.

FIG. 3 is a block diagram representing a general purpose computer system in which aspects of the disclosed technology and/or portions thereof may be incorporated. As shown, the exemplary general purpose computing system includes a computer 320 or the like, including a processing unit 321, a system memory 322, and a system bus 323 that couples various system components including the system memory to the processing unit 321. The system bus 323 may be any of several types of bus structures including a memory bus or memory controller, a peripheral bus, and a local bus using any of a variety of bus architectures. The system memory includes read-only memory (ROM) 324 and random access memory (RAM) 325. A basic input/output system 326 (BIOS), containing the basic routines that help to transfer information between elements within the computer 320, such as during start-up, is stored in ROM 324.

The computer 320 may further include a hard disk drive 327 for reading from and writing to a hard disk (not shown), a magnetic disk drive 328 for reading from or writing to a removable magnetic disk 329, and an optical disk drive 330 for reading from or writing to a removable optical disk 331 such as a CD-ROM or other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide non-volatile storage of computer readable instructions, data structures, program modules and other data for the computer 320.

Although the exemplary environment described herein employs a hard disk, a removable magnetic disk 329, and a removable optical disk 331, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 329, optical disk 331, ROM 324 or RAM 325, including an operating system 335, one or more application programs 336, other program modules 337 and program data 338. A user may enter commands and information into the computer 320 through input devices such as a keyboard 340 and mouse 342. Other input devices (not shown) may include a microphone, joystick, game pad, satellite disk, scanner, or the like. These and other input devices are often connected to the processing unit 321 through a serial port interface 346 that is coupled to the system bus, but may be connected by other interfaces, such as a parallel port, game port, or universal serial bus (USB). A monitor 347 or other type of display device is also connected to the system bus 323 via an interface, such as a video adapter 348. In addition to the monitor 347, a computer may include other peripheral output devices (not shown), such as speakers and printers. The exemplary system of FIG. 3 also includes a host adapter 355, a Small Computer System Interface (SCSI) bus 356, and an external storage device 362 connected to the SCSI bus 356.

The computer 320 may operate in a networked environment using logical connections to one or more remote computers, such as a remote computer 349. The remote computer 349 may be a personal computer, a server, a router, a network PC, a peer device or other common network node, and may include many or all of the elements described above relative to the computer 320, although only a memory storage device 350 has been illustrated in FIG. 3. The logical connections depicted in FIG. 3 include a local area network (LAN) 351 and a wide area network (WAN) 352. Such networking environments are commonplace in offices, enterprise-wide computer networks, intranets, and the Internet.

When used in a LAN networking environment, the computer 320 is connected to the LAN 351 through a network interface or adapter 353. When used in a WAN networking environment, the computer 320 may include a modem 354 or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing a communications link between the computers may be used.

Computer 320 may include a variety of computer readable storage media. Computer readable storage media can be any available media that can be accessed by computer 320 and includes both volatile and nonvolatile media, removable and non-removable media. By way of example, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 320. Combinations of any of the above should also be included within the scope of computer readable media that may be used to store source code for implementing the methods and systems described herein. Any combination of the features or elements disclosed herein may be used in one or more embodiments.

While the invention has been described in connection with what is presently considered to be the most practical and preferred examples, it is to be understood that the invention is not to be limited to the disclosed examples, but on the contrary, is intended to cover various modifications and equivalent arrangements included within the spirit and scope of the appended claims.

What is claimed is:

1. A system, comprising:
   a transport medium to convey a fuel flow;
   an injection device to inject an inert gas into the fuel flow to form a gas mixture; and
   a gas composition measuring device downstream of the injection device to measure a concentration of the inert gas in the gas mixture,
   wherein a flow rate of the fuel flow is calculated based on the measured concentration of the inert gas in the gas mixture.

2. The system of claim 1, wherein the transport medium is configured to convey the fuel flow to a gas turbine for combustion, and wherein the gas composition measuring device is arranged to measure the concentration of the inert gas in the gas mixture upstream of the gas turbine.

3. The system of claim 1, wherein the fuel flow powers at least one gas turbine.

4. The system of claim 1, further comprising a controller to control a device based on the calculated flow rate of the fuel flow.

5. The system of claim 1, further comprising a flow meter to measure an amount of the inert gas injected into the fuel flow, wherein the flow rate of the fuel flow is calculated based on the amount of the inert gas injected into the fuel flow and the measured concentration of the inert gas in the gas mixture.

6. The system of claim 1, further comprising a controller to control a device based on the measured concentration of the inert gas.

7. The system of claim 4, wherein the device is a gas turbine.

8. The system of claim 1, wherein the inert gas is neon.

9. A method of measuring the flow rate of a gas, comprising:
   injecting an inert gas into a fuel flow at an injection location;
   mixing the inert gas with the fuel flow to form a gas mixture;
   measuring a concentration of the inert gas in the gas mixture downstream of the injection location; and
   calculating a flow rate of the fuel flow based on the measured concentration of the inert gas in the gas mixture.

10. The method of claim 9, further comprising conveying the fuel flow to a gas turbine for combustion,
    wherein the concentration of the inert gas in the gas mixture is measured upstream of the gas turbine.

11. The method of claim 9, wherein the fuel flow powers at least one gas turbine.

12. The method of claim 9, further comprising controlling, with a controller, a device based on the calculated flow rate of the fuel flow.

13. The method of claim 9, further comprising measuring an amount of the inert gas injected into the fuel flow, wherein the flow rate of the fuel flow is calculated based on the amount of the inert gas injected into the fuel flow and the measured concentration of the inert gas in the gas mixture.

14. The method of claim 9, wherein the inert gas is neon.

15. A gas turbine system, comprising;
    a fuel line to convey a flow of fuel to a combustor section of a gas turbine;
    an injection device to inject an inert gas into the fuel flow to form a gas mixture; and
    a gas composition measuring device downstream of the injection device to measure a concentration of the inert gas in the gas mixture,
    wherein a flow rate of the fuel flow is calculated based on the measured concentration of the inert gas in the gas mixture.

16. The gas turbine system of claim 15, further comprising a controller to control the gas turbine based on the calculated flow rate of the fuel flow.

17. The gas turbine system of claim 15, further comprising a flow meter to measure an amount of the inert gas injected into the fuel flow, wherein the flow rate of the fuel flow is calculated based on the amount of the inert gas injected into the fuel flow and the measured concentration of the inert gas in the gas mixture.

18. The gas turbine system of claim 15, further comprising a controller is control the gas turbine based on the measured concentration of the inert gas.

19. The gas turbine system of claim 15, wherein the inert gas is neon.

\* \* \* \* \*

UNITED STATES PATENT AND TRADEMARK OFFICE
CERTIFICATE OF CORRECTION

PATENT NO. : 9,777,637 B2  
APPLICATION NO. : 13/719714  
DATED : October 3, 2017  
INVENTOR(S) : Steven W. Tillery et al.

Page 1 of 1

It is certified that error appears in the above-identified patent and that said Letters Patent is hereby corrected as shown below:

In the Claims

Claim 18, Column 6, Line 56, change "is control" to --to control--

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*